United States Patent [19]
Berstis

[11] Patent Number: 6,105,021
[45] Date of Patent: Aug. 15, 2000

[54] THOROUGH SEARCH OF DOCUMENT DATABASE CONTAINING COMPRESSED AND NONCOMPRESSED DOCUMENTS

[75] Inventor: Viktors Berstis, Austin, Tex.

[73] Assignee: International Business Machines Corporation, Armonk, N.Y.

[21] Appl. No.: 08/976,213

[22] Filed: Nov. 21, 1997

[51] Int. Cl.$^7$ ........................................... G06F 17/30
[52] U.S. Cl. .................... 707/3; 707/4; 707/5; 707/10
[58] Field of Search ................. 704/9; 707/3, 5, 707/10, 104, 4; 395/200.34; 341/51

[56] References Cited

U.S. PATENT DOCUMENTS

| | | | |
|---|---|---|---|
| 5,099,426 | 3/1992 | Carlgren et al. ......................... | 704/9 |
| 5,623,652 | 4/1997 | Vora et al. ............................... | 707/10 |
| 5,704,060 | 12/1997 | Del Monte ............................. | 707/104 |
| 5,715,443 | 2/1998 | Yanagihara et al. ..................... | 707/3 |
| 5,737,733 | 4/1998 | Eller ....................................... | 707/3 |
| 5,742,816 | 4/1998 | Barr et al. ............................... | 707/104 |
| 5,754,776 | 5/1998 | Hales, II et al. ..................... | 395/200.34 |
| 5,812,999 | 9/1998 | Tateno ................................... | 707/3 |
| 5,826,261 | 10/1998 | Spencer ................................. | 707/5 |
| 5,854,597 | 12/1998 | Murashita et al. ...................... | 341/51 |
| 5,873,076 | 2/1999 | Barr et al. .............................. | 707/3 |

OTHER PUBLICATIONS

SPI Document (adaboe046.0067,9–1/94) The Muscat Indexing Suite (http://www.muscat.co.uk/lstest2/fxiag.htm).
Welcome to Pacific Gold Coast (http://www.pgcc.com/start.htm) "Acrobat 3: Preview of the Conrucopia" (http://onix.com/tonymck/iwacrob3.htm).

*Primary Examiner*—Wayne Amsbury
*Assistant Examiner*—Thuy Pardo
*Attorney, Agent, or Firm*—Jeffrey S. LaBaw

[57] ABSTRACT

A thorough search of a distributed document database, such as the Internet, is conducted according to a search request including search parameters and a search starting point. Initially, documents found at the search starting point are added to a processing list. A determination is made whether a next document in the processing list is a plain text document or a compressed document. If the next document is a compressed document, it is decompressed to produce a plain text version of the next document. Next, the plain text version of the next document is searched according to the search parameters and for references to other documents. The documents referenced by the next document are appended to the processing list. This process is repeated until inspection of the processing list is declared to be concluded. A list of processed documents which meet the search criteria are returned to a user.

23 Claims, 5 Drawing Sheets

| FOUND | SEARCHED | URL | DOCUMENT TITLE | FILE NAME | STARTING POINT | HOW DEEP? |
|---|---|---|---|---|---|---|
|  | √ | ~ | ~ | ~ | √ | 0 |
| √ | √ | ~ | ~ | ~ |  | 1 |
|  | √ | ~ | ~ | ~ |  | 1 |
|  |  | ~ | ~ | ~ |  | 2 |
|  |  |  |  |  |  |  |
|  |  |  |  |  |  |  |

THOROUGH SEARCH OF DOCUMENT DATABASE CONTAINING COMPRESSED AND NONCOMPRESSED DOCUMENTS

BACKGROUND OF THE INVENTION

This invention relates generally to information retrieval in a distributed computer environment. More particularly, it relates to a thorough search of plain text and compressed documents in a distributed database such as an Internet environment.

It is well known to connect a plurality of computer systems into a network of computer systems. In this way, the collective resources available within the network may be shared among users, thus allowing each connected user to enjoy resources which would not be economically feasible to provide to each user individually. With the growth of the Internet, sharing of computer resources has been brought to a much wider audience; it has become a cultural fixture in today's society for both information and entertainment. Government agencies employ Internet sites for a variety of informational purposes. For many companies, their Internet sites are an integral part of their business; they are frequently mentioned in the companies' television, radio and print advertising.

The World Wide Web, or simply "the web", is the Internet's multimedia information retrieval system. It is the most commonly used method of transferring data in the Internet environment. Other methods exist such as the File Transfer Protocol (FTP) and Gopher, but have not achieved the popularity of the Web. Client machines accomplish transactions to Web servers using the Hypertext Transfer Protocol (HTTP), which is a known application protocol providing users access to files, e.g,, text, graphics, images, sound, video, using a standard page description language known as the Hypertext Markup Language (HTML). HTML provides basic document formatting and allows the developer to specify "links" to other servers and files. In the Internet paradigm, a network path to a server is identified by a Uniform Resource Locator (URL) having a special syntax for defining a network connection.

Retrieval of information is generally achieved by the use of an HTML-compatible "browser", e.g., Netscape Navigator, at a client machine. When the user of the browser specifies a link via a URL, the client issues a request to a naming service to map a hostname in the URL to a particular network IP address at which the server is located. The naming service returns a list of one or more IP addresses that can respond to the request. Using one of the IP addresses, the browser establishes a connection to a server. If the server is available, it returns a document or other object formatted according to HTML.

One of the frustrations of the web is that although there is a cornucopia of information stored in the various documents, it is often very difficult to locate. There are a variety of search engines both of a general nature such as Alta Vista, HotBot and Excite which search a plurality of different web sites as well as the search engines on the web sites themselves. The results for these search engines are unpredictable and vary from search engine to search engine.

One of the problems is that the search engines ignore the many zip files, PDF files or otherwise compressed files on the server. At most, a name of the file is searched or a one line description of the file in an index. This is usually insufficient. The compression of the files is important to reduce the load on the Internet as well as provide a better chance that a user will receive a file without transmission errors in a reasonable amount of time. However, many times the information for which the user is searching is located in one of the compressed files. Due to the nature of prior art search engines, the user is forced to manually decompress and search the files. This is unacceptable.

The present invention provides a solution to this problem.

SUMMARY OF THE INVENTION

Therefore, it is an object of the invention to provide a through search of the documents on the Internet.

It is another object of the invention to search compressed documents stored at an Web server.

It is another object of the invention to control the thoroughness of the search.

These and other objects are accomplished by a thorough search of a distributed document database, such as the Internet, according to a search request including search parameters and a search starting point. Initially, documents found at the search starting point are added to a processing list. A determination is made whether a next document in the processing list is a plain text document or a compressed document. If the next document is a compressed document, it is decompressed to produce a plain text version of the next document. Next, the plain text version of the next document is searched according to the search parameters and for references to other documents. The documents referenced by the next document are appended to the processing list. This process is repeated until inspection of the processing list is declared to be concluded. A list of processed documents which meet the search criteria are returned to a user.

The determination that inspection of the processing list is concluded can be accomplished in several ways. All of the referenced documents could be searched. Alternatively, a limit to the thoroughness of the search set prior to processing. The processing could be terminated according to a distance factor. The distance factor could be a number of servers or hyperlinks from the original starting point from which documents can be retrieved. The distance factor could be the number of server switches allowed from the original starting point. Other limits such as the time or resources which can be devoted to a single search can be used.

BRIEF DESCRIPTION OF THE DRAWINGS

These objects, features and advantages will be more readily understood with reference to the attached figures and following description.

DETAILED DESCRIPTION OF THE DRAWINGS

The invention may be run on a variety of computers or collection of computers under a number of different operating systems. The computer could be, for example, a personal computer, a mini computer, mainframe computer or a computer running in a distributed network of other computers. Although the specific choice of computer is limited only by processor speed and disk storage requirements, computers in the IBM PC series of computers could be used in the present invention. One operating system which an IBM personal computer may run is IBM's OS/2 Warp 4.0. In the alternative, the computer system might be in the IBM RISC System/6000 (TM) line of computers which run on the AIX (TM) operating system.

Figure 1:
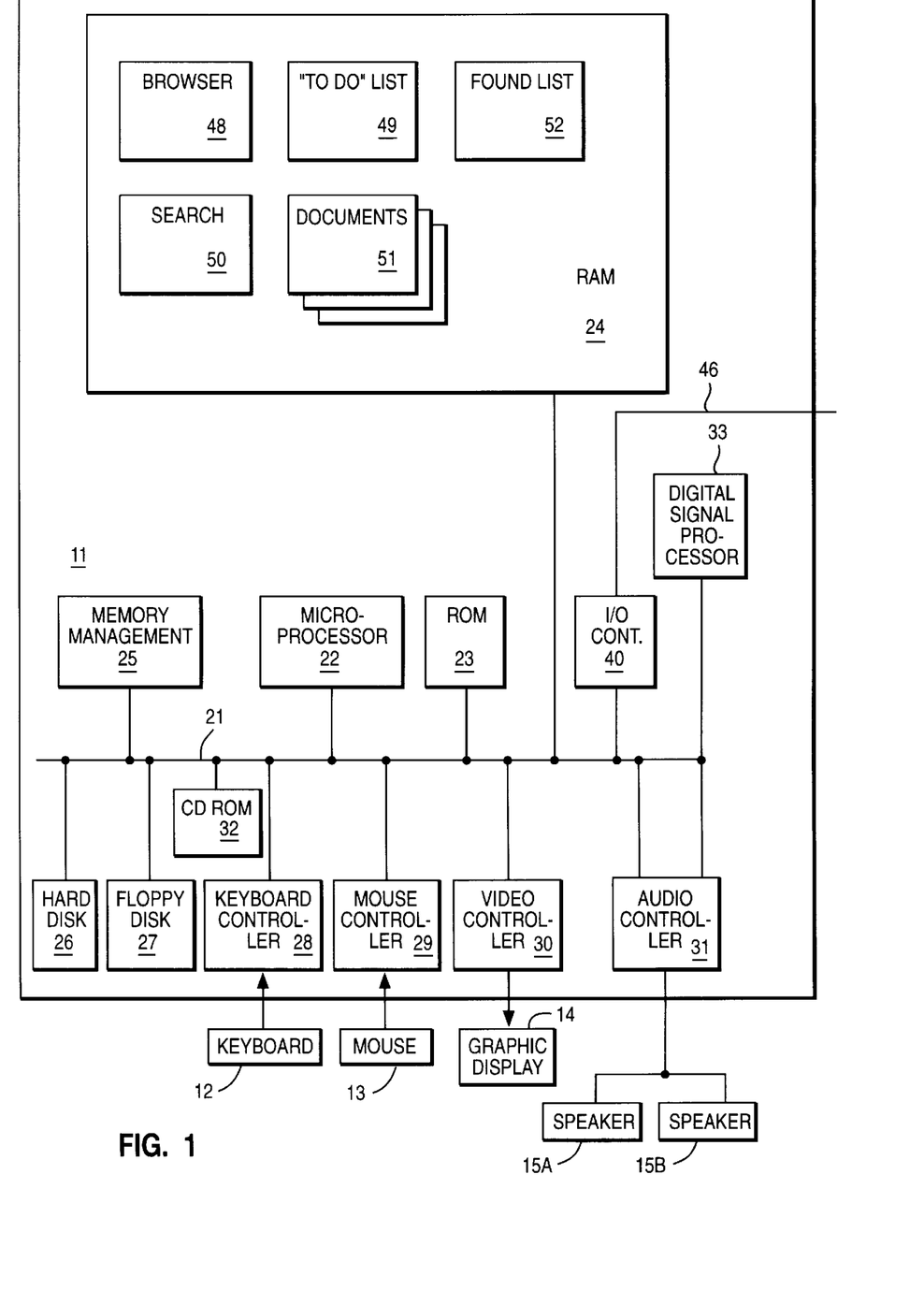
FIG. 1 depicts a computer system configured according to the teachings of the present invention.

In FIG. 1, a computer 10, comprising a system unit 11, a keyboard 12, a mouse 13 and a display 14 are depicted in block diagram form. The system unit 11 includes a system bus or plurality of system buses 21 to which various components are coupled and by which communication between the various components is accomplished. The microprocessor 22 is connected to the system bus 21 and is supported by read only memory (ROM) 23 and random access memory (RAM) 24 also connected to system bus 21. A microprocessor in the IBM PC series of computers is one of the Intel family of microprocessors including the 386, 486 or Pentium microprocessors. However, other microprocessors including, but not limited to, Motorola's family of microprocessors such as the 68000, 68020 or the 68030 microprocessors and various Reduced Instruction Set Computer (RISC) microprocessors such as the PowerPC chip manufactured by IBM. Other RISC chips made by Hewlett Packard, Sun, Motorola and others may be used in the specific computer.

The ROM 23 contains among other code the Basic Input-Output system (BIOS) which controls basic hardware operations such as the interaction of the processor and the disk drives and the keyboard. The RAM 24 is the main memory into which the operating system and application programs are loaded. The memory management chip 25 is connected to the system bus 21 and controls direct memory access operations including, passing data between the RAM 24 and hard disk drive 26 and floppy disk drive 27. The CD ROM 32 also coupled to the system bus 21 is used to store a large amount of data, e.g., a multimedia program or presentation.

Also connected to this system bus 21 are various I/O controllers: The keyboard controller 28, the mouse controller 29, the video controller 30, and the audio controller 31. As might be expected, the keyboard controller 28 provides the hardware interface for the keyboard 12, the mouse controller 29 provides the hardware interface for mouse 13, the video controller 30 is the hardware interface for the display 14, and the audio controller 31 is the hardware interface for the speakers 15. An I/O controller 40 such as a Token Ring Adapter enables communication over a network 46 to other similarly configured data processing systems.

One of the preferred implementations of the invention is as sets of instructions 48–52 resident in the random access memory 24 of one or more computer systems configured generally as described above. Until required by the computer system, the set of instructions may be stored in another computer readable memory, for example, in the hard disk drive 26, or in a removable memory such as an optical disk for eventual use in the CD-ROM 32 or in a floppy disk for eventual use in the floppy disk drive 27. Further, the set of instructions can be stored in the memory of another computer and transmitted over a local area network or a wide area network such as the Internet when desired by the user. One skilled in the art would appreciate that the physical storage of the sets of instructions physically changes the medium upon which it is stored electrically, magnetically, or chemically so that the medium carries computer readable information. While it is convenient to describe the invention in terms of instructions, symbols, characters, or the like, the reader should remember that all of these and similar terms should be associated with the appropriate physical elements.

Further, the invention is often described in terms that could be associated with a human operator. While the operations performed may be in response to user input, no action by a human operator is desirable in any of the operations described herein which form part of the present invention; the operations are machine operations processing electrical signals to generate other electrical signals.

In the Internet, the Web server accepts a client request and returns a response back to the client. A series of server commuter may be involved in the retrieval of a specific web page. The operation of the server program is governed by a number of server application functions (SAFs), each of which is configured to execute in a certain stop of a sequence. This sequence, illustrated in FIG. 2, begins with the authorization translation step 75 during which the web server translates any authorization information sent by the web client into a user and a group. If necessary, the step 75 may decode a message to get the actual client request. At the name translation step 77, the URL associated with the request may or may not be translated into a system-dependent file name, a redirection URL or a mirror site. In the path checks step 79, the server performs various tests on the resulting path to ensure that the given client may retrieve the document.

Figure 2:
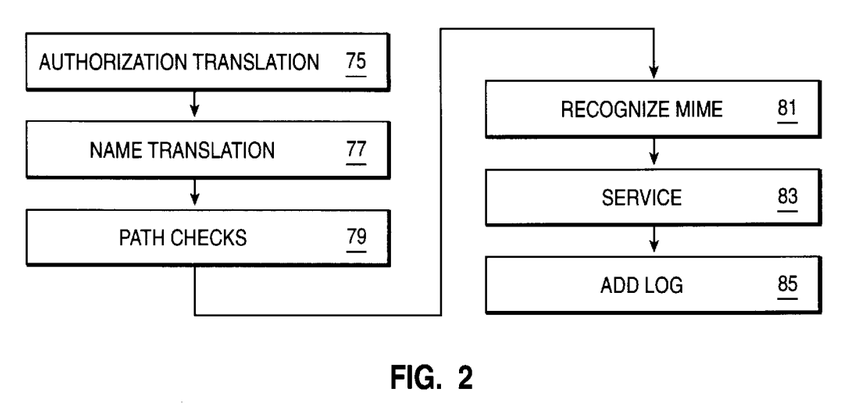
FIG. 2 depicts retrieval of a document in the Internet architecture.

In step 81, Multipurpose Internet Mail Extension (MIME) type information, e.g., text/html, image/gif, for the given document is recognized. In the service step 83, the Web server routine selects an internal server function to send the retrieved information back to the requesting web client. This function can run the normal server service routine to return a file or some other server function, such as a program to return to return a custom document or a CGI program. At the Add Log step 85, information about the transaction is recorded.

A URL or "Uniform Resource Locator" is defined in RFC 1945, which is incorporated herein by reference. As is well known, the URL is typically of the format: http://somehost/. . . " where "somehost" is the hostname position of the URL. The usual manner in which a URL is resolved into an actual IP address for a web server is through the use of a nameserver. In an internet or intranet network, a nameserver maps hostnames in URLs to actual network addresses. An example of a nameserver is the Domain Name Service (DNS) currently implemented in the Internet. The process of having a Web client request a hostname and address from a nameserver is sometimes called resolution. In TCP/IP, the nameserver resolves the hostname into a list of one or more IP addresses which are returned to the Web client on an HTTP request. Each IP address identifies a server which hosts the requested content made by the browser.

Figure 3:
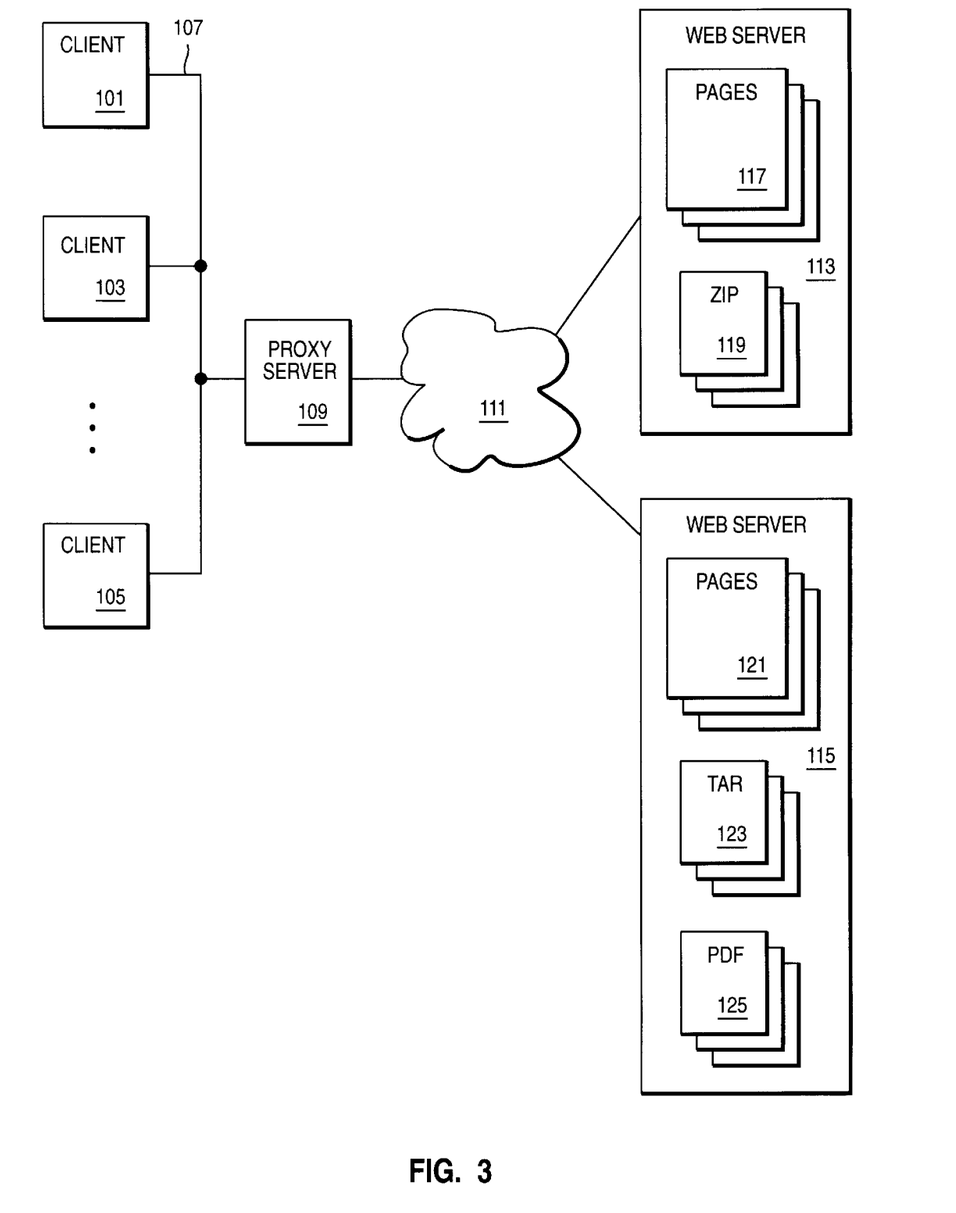
FIG. 3 shows an architecture in which the present invention might be implemented.

A simplified illustration of an intranet/intranet environment is shown in FIG. 3. A plurality of clients 101, 103, 105 are coupled by means of a network 107 to a proxy server 109. As is known, the proxy server 109 provides the connection to the Internet 111 for the clients 101–105. Collectively, the clients, network and proxy server can be considered as an intranet. Typically, the proxy server 109 contains firewall software to protect sensitive information on the company intranet from access by the public.

Alternatively, the client computers can be connected to the Internet by means of a server belonging to an Internet Service Provider (ISP). There are many well known nation wide ISPs such as America Online or MCI as well as other locally based ISPs.

A client 101 will make a request in an Internet protocol such as HTTP, FTP or Gopher to one or more Web servers 113, 115 via the proxy server 109 and Internet 111. Those skilled in the art understand that there may be many intermediary servers, routers and gateway machines between the client 101 and the web server 113 which are not pictured. The Web servers 113, 115 store many documents as Web pages 117, 121 in uncompressed form. The problem lies in that many web servers 113, 115 also store documents in compressed formats such as zip files 119, tar files 123 and PDF files 125 which are not searchable in these formats. These and other compression formats are known to the art; no doubt there will be new formats in the future which can benefit from the teachings of the present invention.

One very typical request which a client is apt to make of a web server is to search its storage for a document which covers a particular subject of interest. Typically, this search is done by a keyword search, although other search methods are known to the art. Unfortunately, the web server generally fails to conduct a search on the compressed files at all. This often fails to find stored, compressed documents which contain the information requested by the user.

This invention provides a solution to the problem. Compressed files are uncompressed and searched. Those which pertain to the subject of interest are kept in a search list; those which do not are returned to their compressed state, or otherwise discarded by the search engine. Note that the main copies remain stored by the web site. References to documents are kept in a "to do" list until a specified level of searching is concluded.

The invention has three embodiments. The search could be performed at the web server itself. The search could be performed at the proxy server or the search could be performed at the client. Each of the implementations have their own advantages and disadvantages. It is probably most desirable for the web server to perform the search, because of it is usually among the most powerful computer system. For a search limited to local files stored on the web server, which would be the most typical case, network delays associated with transmission of files is minimal. Further, once the search is performed, it can be catalogued and made available for other users. However, the more thorough search does require greater resources to be devoted to a single client request. It may be impractical, especially for popular sites, to offer such a service.

However, if the web server does not perform the thorough search of the invention, the ability for the proxy server or client to perform a more thorough search will alleviate much user misery. The proxy server in comparison to the client has many of the same advantages as the web server, but on a smaller scale. It is a more powerful machine than the client. The proxy server's search results could be cached, for use by other clients which it services in the intranet, although this is a less likely scenario than for the web server. One disadvantage is also similar that the proxy server is shared among many clients. It may not be feasible to offer this sort of service with an existing machine; upgrading to a more capable machine is expensive. The time to download the files is also a disadvantage with the proxy server machine. The search can also be performed by another server which is not the proxy/firewall server for the client, but the processes will be very similar to the proxy server case, albeit with slightly longer network transmission time to the client with the results of the search.

The client is the least powerful machine with the longest network access time to the compressed files. However, it offers the most control and is potentially the most thorough of the searches. Since the client is devoted to a single user, it does not have to be concerned with sharing resources which may be bounded in time or disk space with other users. Thus, the search can continue as long as the user wishes (and there remains storage available to the client computer). The user also has greater knowledge of the actual parameters of the search, since he is more directly involved. Once the search is complete, the files are stored at the client ready for use. There are no additional delays waiting for download of the desired files from the list of search results returned by either of the servers.

Figure 4:
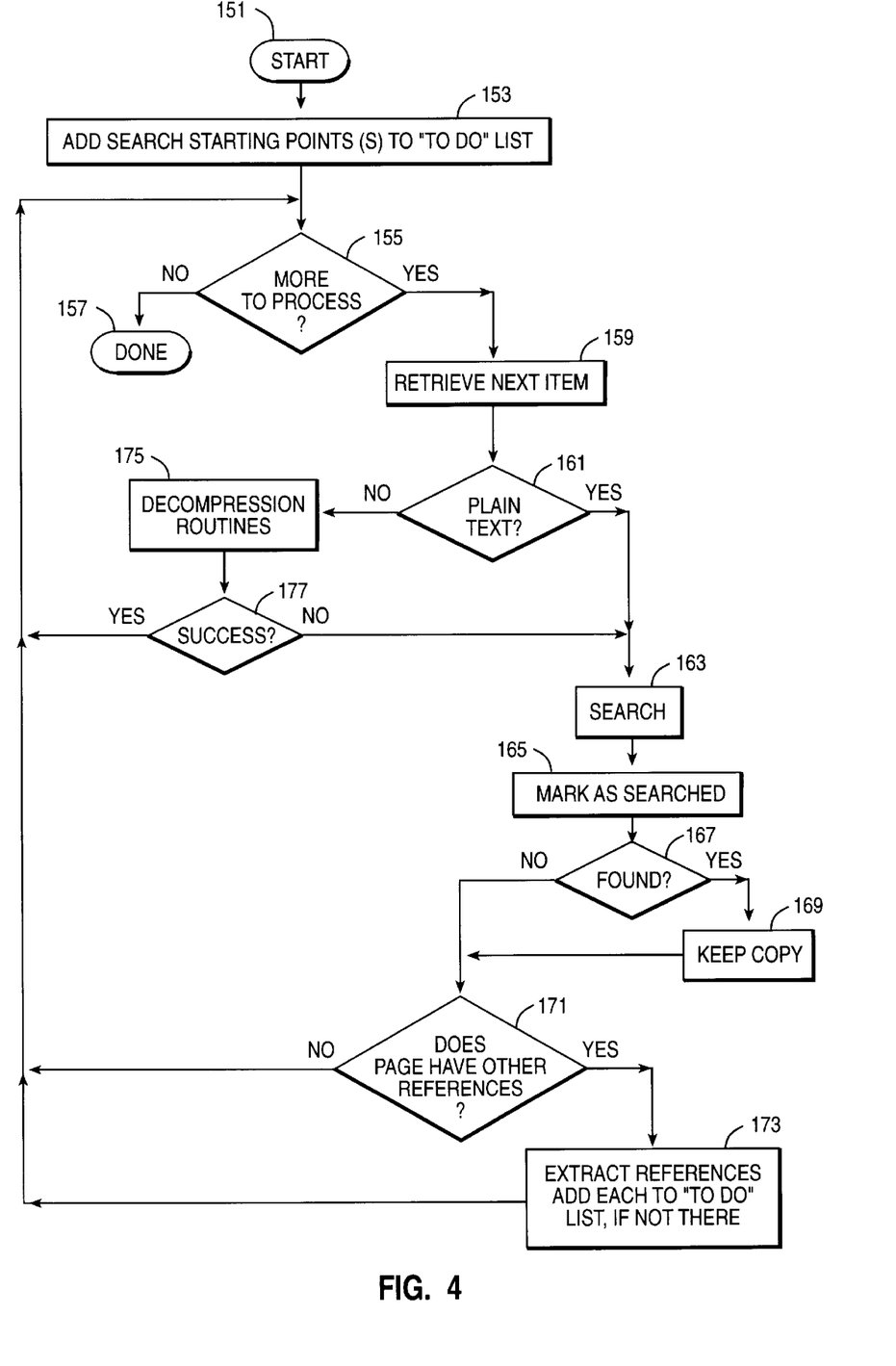
FIG. 4 is a flow diagram of the more thorough search process of the present invention.

The basic process is shown in FIG. 4. Some of the steps will vary according to where the process is being performed, i.e. web server, proxy server or client. Step 151 represents the beginning of the process where the user has made a search request based on some desired information, e.g., a keyword search. In step 153, the search starting points are added to a "to do" list. In the preferred embodiment, the search starting points are kept for the duration of the search so that the desired thoroughness of the search can be achieved. The search starting points are typically URL referents to one or more web pages. Since a search in the Web can continue ad infinitum, the invention, particularly for the web server and proxy server embodiments, places a limit on the "distance" from the starting points which the search is allowed to continue. The distance is configurable in several different ways as will be discussed in greater detail below.

Step 155 determines whether there is more to process. Initially, unless the search list is empty, there will be documents to review. Once the search is over, step 157, the server (or client) returns a list of documents to the browser which meet the search criteria. Possibly, a set of compressed and/or uncompressed files can be sent with the list, however, in interests of conserving network bandwidth, it preferred to wait until the user selects which documents from the search list he is actually interested.

In step 159, the next item in the "to do" list is retrieved. If the web server is retrieving the web document, at least initially, this step is a reference to the web content stored in the DASD connected to the web server rather than a network request. The proxy server or client must make a request in an Internet protocol, e.g., an HTTP request, to the web server. However, as the search progresses, depending on the distance criteria the web server may also make requests of other web servers for web documents.

Test 161 determines whether the document is plain text. For the purposes of this invention, uncompressed web pages written in HTML or other programming languages are considered to be plain text. If so in step 163, the document is searched according to the search criteria given by the user. The document is marked as searched in the "to do" list, step 165. The test in step 167 determines whether the search criteria was found in the document. If so, a copy of the document is kept available in anticipation of a future request for the document and the document in the "to do" list is marked as found. The documents which meet the search criteria can be kept in a local or remote cache in either compressed or uncompressed form. When full, the cache can be flushed on a FIFO or time out basis for retrieved documents.

Next, in step 171, the page is parsed to determine whether there are references, e.g., hyperlinks, to other web documents or files. In step 173, the references are extracted from the page and compared to the existing entries in the "to do" list. New references which are not in the "to do" list and meet the distance criteria set by the user, or default criteria if none has been set by the user, are added to the "to do" list.

If the document is not plain text, it is sent to the decompression routines in step 175. These routines are described in greater detail below with reference to FIG. 5. Step 177 determines whether the document was successfully decompressed. If so, it is added to the "to do" list. If not, it is searched in the plain text search in step 163, on the chance that a plain text search will be successful.

Once all the documents within the distance criteria have been processed, the search ends, step 157, with the return of the list of documents and their network addresses, e.g., URLs, which were marked "found". If the search is being performed at the web server or proxy server, pointers to cached documents may be returned with the list.

Figure 5:
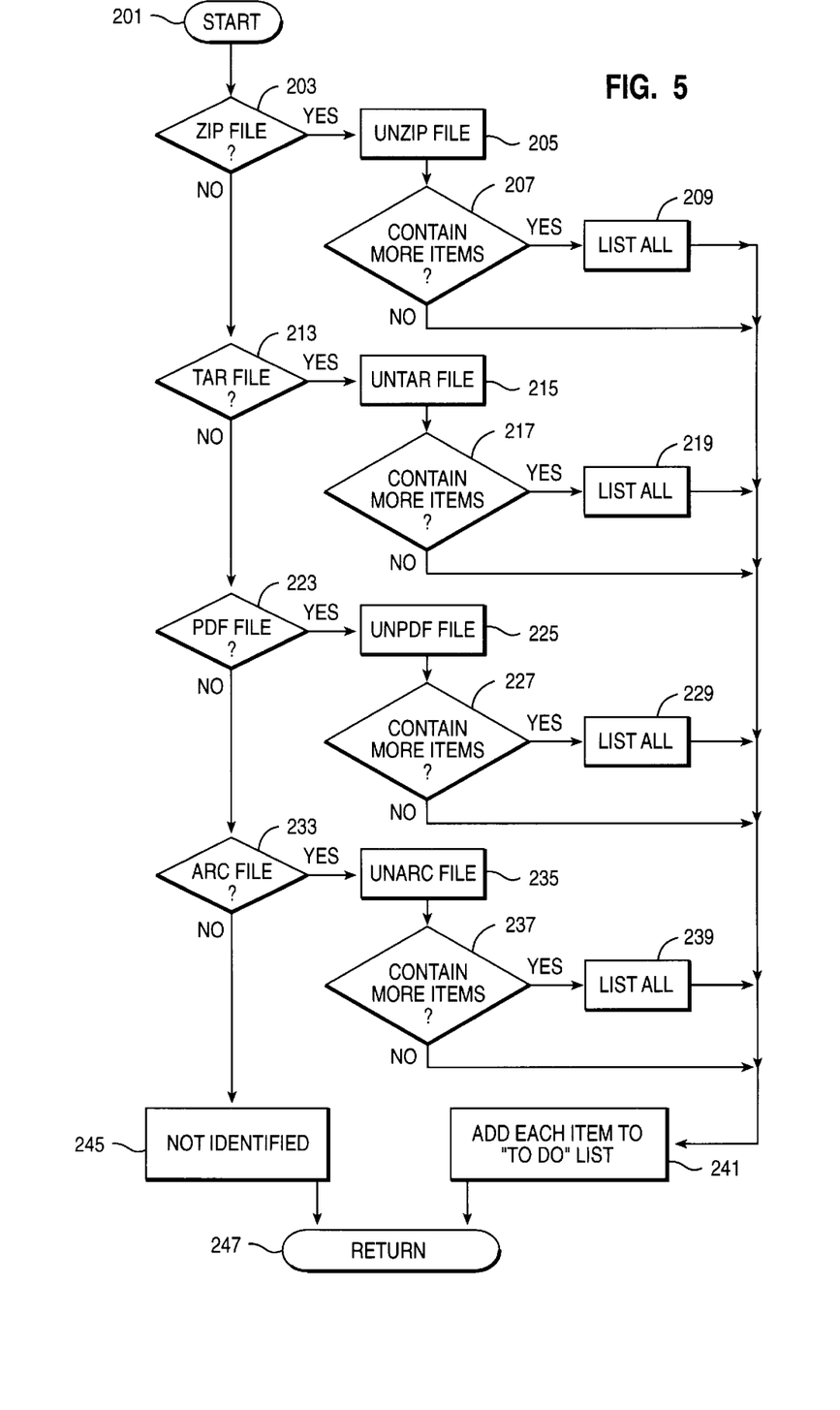
FIG. 5 is a flow diagram of decompression routines for the present invention.

The decompression routines are shown in FIG. 5. The particulars of compression and decompression algorithms themselves are well known and will not be discussed in detail. Depending on the embodiment of the invention, many of the steps listed may be eliminated, or other methods of decompression may be required. In the web server environment, it may be known how the files are compressed on the web server; they may be compressed in a single method. Thus, the other decompression methods are not needed so long as the distance from the initial search points is constrained to the server, or nearby known servers. Where the distance is not constrained, more decompression algorithms are likely necessary. However, in the client and proxy server embodiments, it is not likely that the compression methods of a given server will be known a priori. Of course, the client could be a special purpose client constrained to browse a limited set of known web servers having known decompression methods. Those skilled in the art would appreciate that a given implementation of the invention could have many more or fewer decompression methods available.

The process is called in step 201, labelled start. In step 203, a test determines whether the compressed file is a zip file. In general, the first few bytes of a compressed file have some signature indicating its compression type. The extension of the file, e.g., zip, is also an indication. If all else fails decompression of a small portion of the file can be performed and then parsed to see if the decompressed file appears to be plain text. There are a number of known "zip" algorithms; some of the best known are the pkzip and pkunzip algorithms from the PKWARE Corporation. The zipped file is unzipped using the appropriate unzip algorithm, step 205. In step 207, the unzipped file is parsed for more referents, e.g., more URLs to other web pages. These are checked against the "to do" list and the distance criteria, step 209. If the found referents are not already in the "to do" list and they meet the distance criteria, they are added to the "to do" list with the unzipped file itself.

If the compressed file is not a zip file, in step 213, a test determines whether the compressed file is a tar file. Tar files are known compressed files used in UNIX based systems. If so, in step 215, the files within the tar file are extracted using the correct extraction algorithm. In step 217, the extracted files are parsed for more referents. The found referents are checked against the "to do" list and the distance criteria, step 219. The identified referents which are not already in the "to do" list and which satisfy the distance criteria are added to the "to do" list.

If the compressed file is not a tar file, in step 223, a test ascertains whether the compressed file is a Portable Document Format (PDF) file used in the PC space. PDF is a file format created by the Adobe Corporation. If so, in step 225, the file is converted to plain text using the appropriate utility. In step 227, the uncompressed file is parsed for more referents. The referents found are compared to the "to do" list and the distance criteria, step 229. The found referents which not in the "to do" list and which meet the distance criteria are added to the "to do" list.

If the compressed file is not a PDF file, in step 233, it is established whether the compressed file is an ARChive file, or simply, an ARC file. ARC Files are used in the PC space for archiving files. If so, in step 235, the file is extracted using the appropriate algorithm. In step 237, the uncompressed file is parsed for more referents. The referents are checked against the "to do" list and the distance criteria, step 239.

Step 241 represents the adding of the cumulative found referents in the various decompression algorithms which are not already in the "to do" list and which meet the distance criteria are added to the "to do" list. If the method of compression is not determined, step 245, it is so noted and the decompression routine returns to the main process, step 247.

Figure 6:
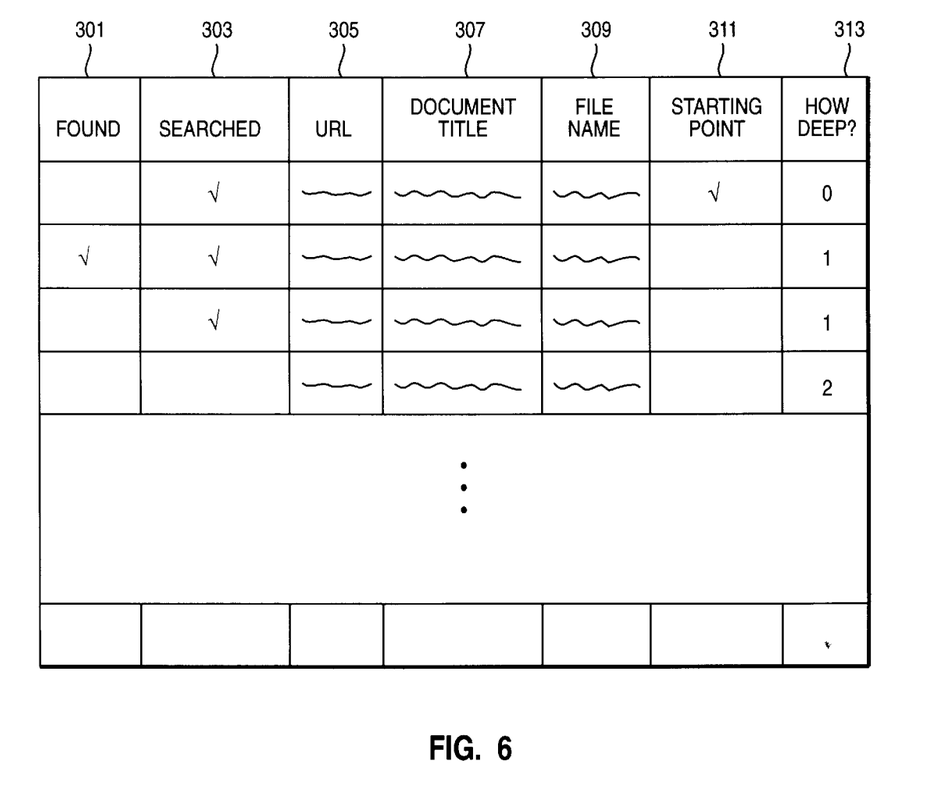
FIG. 6 shows a sample of a "to do" list with searched documents.

An example "to do" list is shown in FIG. 6. Each entry in the list has a field 301 for "found" indicating that the entry meets the search criteria. The entry also has a field 303 for "searched" to note that the entry has been searched. Fields 305, 307 and 309 for URL, document title and file name are used to determine whether additional references should be added to "to do" list. Items which match the information in the "to do" list are not added. It is possible that duplicate copies of the same item exist in multiple places in the web. However, it is preferred to err on the side of searching too many documents than missing a new, and potentially important, document. Thus, matches in title or filename alone are not enough; these items are added to the "to do" list.

It does not matter where the newly found items are added to the "to do" list, although they will generally be added at the bottom. Adding the new items at the bottom has the beneficial effect of spreading the search to several originating search points, or a next tier of identified documents. This is useful if the search is time or resource constrained. The searched field will be enough to locate any unsearched items in the list.

The "to do" list entry may also have a field 311 indicating whether the item was one of the original search points for the search. This field 311 can be used to determine whether new references meet the distance criteria for the search. Alternatively, the original search points may be kept in a separate file.

The "to do" list entry may also have a field 313 indicating how well the entry satisfied the distance criteria. In the figure, a "How deep?" field is given. One possible distance criteria for the search is how many links from the original search point are to be searched. For example, the user may wish the search tool to search documents located within four hyperlinks of the original search point, but no more. The how deep field 313 keeps track of how many hyperlinks have been traversed to get to the current document. It can also be used to prevent considering references in a document which is already at the maximum allowed distance from the original search point.

Other distance criteria which can be used include limits on how far away from the original server(s) the search is allowed to progress. For example, the search can be designed to look at all the documents on the original web server identified as a search point, or allow one or two servers removed from the original server.

The search can also be based on a time or space constraint. This is particularly appropriate in the web server and proxy server embodiments where the resources are shared among users. In these environments, some sort of "fairness" policy is apt to be instituted to prevent a single user from hoarding a disproportionate share of the shared resources. For example, a storage based rule would set aside a certain number of megabytes of storage for a user's search. Once that was full, the search has ended. A time based rule allows the search a certain amount of time using the web server.

Another server based rule is to limit the number of switches in servers from the original starting point. An example rule is to allow one web server switch. Thus the search tool can search all the documents on the server which stores the document at the originally designated starting point, and servers which store a document referenced by a document at the starting point, but may not traverse to other servers.

There are certain pages in the Web which attempt to catalog list of web pages on related subjects. One generally accepted term for these pages is a superlink page. One rule in the preferred embodiment, particularly if the search is time or resource constrained, is to prevent consideration of any link off a superlink page. Otherwise, the search can become much too long. Image maps can cause problems in searches. It is not feasible to search every pixel of the image for a hyperlink. However, a practical matter they can be ignored since there is usually a text based hyperlink to the same information.

The search request can be performed during off peak hours to allow the speedier retrieval of the identified documents. Thus, a scheduler is incorporated in the search tool to accomplish the off peak search.

At the client, as is known in the art, the user can set the search tool to work in the background while he is focusing on other tasks in the user interface. A progress indicator, such as an icon representing the search tool can be presented to allow the user to periodically check on the progress of the search. Alternatively, the search tool may simply present a message at the conclusion of the search.

The search is preferably presented as a list of document titles and their URLs. A summary of the document may also be presented. Some known user interfaces present a percentage of likelihood that the document satisfies the search criteria.

While the invention has been shown and described with reference to particular embodiments thereof, it will be understood by those skilled in the art that the invention can be practiced, with modification, in other environments. For example, although the invention described above can be conveniently implemented in a general purpose computer selectively reconfigured or activated by software, those skilled in the art would recognize that the invention could be carried out in hardware, in firmware or in any combination of software, firmware or hardware including a special purpose apparatus specifically designed to perform the described invention. Therefore, changes in form and detail may be made therein without departing from the spirit and scope of the invention as set forth in the accompanying claims.

I claim:

1. A method for a thorough search of a distributed document database, comprising the steps of:

receiving a search request including search parameters and a search starting point;

adding a document found at the search starting point to a processing list;

determining whether a next document in the processing list is a plain text document or a compressed document;

if the next document is a compressed document, decompressing the next document to produce a plain text version of the next document;

searching the plain text version of the next document according to the search parameters and for references to other documents;

appending documents referenced by the next document to the processing list;

repeating the determining, decompressing, searching and appending steps until inspection of the processing list is concluded; and returning a list of processed documents which meet the search criteria to a user.

2. The method as recited in claim 1 wherein inspection of the processing list is concluded according to a distance factor.

3. The method as recited in claim 2 wherein the distance factor is a number of servers from the original starting point from which documents can be retrieved.

4. The method as recited in claim 2 wherein the distance factor is a number of server switches allowed from the original starting point.

5. The method as recited in claim 1 wherein inspection of the processing list is concluded according to a time factor.

6. The method as recited in claim 1 wherein inspection of the processing list is concluded according to a resource factor.

7. The method as recited in claim 1 wherein the method is performed at a web server and the list of processed documents which meet the search criteria is returned to a web client.

8. The method as recited in claim 1 further comprising the step of caching copies of processed documents which meet the search criteria in anticipation of a request from the user for selected ones of the processed documents.

9. The method as recited in claim 1 wherein the next document is a web document and the references found to the next documents are hyperlinks to another web document.

10. A system including processor and memory for a thorough search of a distributed document database, comprising:

means for receiving a search request including search parameters and a search starting point;

means for adding a document found at the search starting point to a processing list;

means for determining whether a next document in the processing list is a plain text document or a compressed document;

means responsive to finding that the next document is a compressed document for decompressing the next document to produce a plain text version of the next document;

means for searching the plain text version of the next document according to the search parameters and for references to other documents;

means for appending documents referenced by the next document to the processing list;

means for returning a list of processed documents which meet the search criteria to a user; and means for determining that inspection of the processing list is concluded.

11. The system as recited in claim 10 wherein inspection of the processing list is concluded according to a distance factor.

12. The system as recited in claim 11 wherein the distance factor is a number of servers from the original starting point from which documents can be retrieved.

13. The system as recited in claim 10 wherein inspection of the processing list is concluded according to a time factor.

14. The system as recited in claim 10 wherein the system a web server and the list of processed documents which meet the search criteria is returned to a web client.

15. The system as recited in claim 10 further comprising a cache for caching copies of processed documents which meet the search criteria in anticipation of a request from the user for selected ones of the processed documents.

16. A method for a thorough search of a hyperlinked document database, comprising the steps of:

receiving a search request including search parameters and a search starting point;

adding documents found at the search starting point and within a distance factor to the search starting point to a processing list;

if a respective document in the processing list is a compressed document, decompressing the document to produce a plain text version of the document;

searching the documents according to the search parameters and for references to other documents to append to the processing list; and returning a list of processed documents which meet the search criteria to a user.

17. The method as recited in claim 16 wherein the distance factor is a number of servers from the original starting point from which documents can be retrieved.

18. The method as recited in claim 16 wherein the distance factor is a number of server switches allowed from the original starting point.

19. The method as recited in claim 16 wherein the distance factor is a number of hyperlinks traveled from a document at the original starting point.

20. A computer program product in a computer readable medium for a thorough search of a hyperlinked document database, comprising:

means for receiving a search request including search parameters and a search starting point;

means for adding documents found at the search starting point and within a distance factor to the search starting point to a processing list;

means for decompressing documents in the processing list as needed to produce plain text versions of the documents;

means for searching plain text versions of the documents according to the search parameters and for references to other documents to append to the processing list; and means for returning a list of processed documents which meet the search criteria to a user.

21. The product as recited in claim 20 wherein the distance factor is a number of servers from the original starting point from which documents can be retrieved.

22. The product as recited in claim 20 wherein the distance factor is a number of server switches allowed from the original starting point.

23. The product as recited in claim 20 wherein the distance factor is a number of hyperlinks traveled from a document at the original starting point.

* * * * *